United States Patent [19]

Singer

[11] Patent Number: 5,071,504
[45] Date of Patent: * Dec. 10, 1991

[54] DOUBLE SIDED LAMINATING MACHINE

[75] Inventor: Karl Singer, Barrington Hills, Ill.

[73] Assignee: D&K Custom Machine Design, Inc., Elk Grove Village, Ill.

[*] Notice: The portion of the term of this patent subsequent to May 28, 2008 has been disclaimed.

[21] Appl. No.: 421,241

[22] Filed: Oct. 13, 1989

Related U.S. Application Data

[60] Continuation-in-part of Ser. No. 389,510, Aug. 4, 1989, which is a continuation-in-part of Ser. No. 104,604, Oct. 5, 1987, abandoned, which is a division of Ser. No. 903,391, Sep. 3, 1986, Pat. No. 4,743,334, and a continuation-in-part of Ser. No. 830,852, Feb. 19, 1986, abandoned.

[51] Int. Cl.$^5$ .................. B30B 3/04; B32B 31/10; B32B 31/20
[52] U.S. Cl. .................. 156/301; 100/93 RP; 156/320; 156/499; 156/555; 156/583.1; 219/244; 226/177; 226/178; 226/191
[58] Field of Search .................. 156/301, 309.9, 320, 156/499, 555, 582, 583.1; 226/111, 176, 177, 186, 187, 178, 191; 100/93 P, 93 RP; 219/244; 29/116.1

[56] References Cited

U.S. PATENT DOCUMENTS

| | | | |
|---|---|---|---|
| 2,818,904 | 1/1958 | Ambrose | 156/582 |
| 2,831,097 | 4/1958 | Malewski | 219/470 |
| 3,143,454 | 8/1964 | Hannon | 156/301 |
| 3,208,898 | 9/1965 | Chavannes et al. | 156/498 |
| 3,465,941 | 9/1969 | Fournier | 226/177 |
| 3,471,683 | 10/1969 | Bogue | 219/244 |
| 3,764,441 | 10/1973 | Bley | 156/552 |
| 4,158,429 | 6/1979 | Ohmori | 226/177 |
| 4,268,345 | 5/1981 | Semchuck | 156/555 |
| 4,310,365 | 1/1982 | Elliott et al. | 156/555 |
| 4,610,747 | 9/1986 | Bregenzer | 156/322 |

FOREIGN PATENT DOCUMENTS 0261246 3/1988 European Pat. Off. .
1219431 1/1971 United Kingdom .

Primary Examiner—Michael Wityshyn
Attorney, Agent, or Firm—Wallenstein Wagner & Hattis, Ltd.

[57] ABSTRACT

A laminating system includes a pair of heated laminated rollers (14) for drawing laminating film (12) from supply rolls and preheat members (30) between the supply rolls and the laminating rollers. The preheat rollers are heated internally by a bonded electrical heating element, while the laminating rollers are heated by a separate bonded internal heating element. The system includes pull rollers (18) for drawing the laminated articles from the supply roll (10) across preheat rollers (30) and through laminating roll (14) with a blower system (20, 242) for cooling the articles.

12 Claims, 3 Drawing Sheets

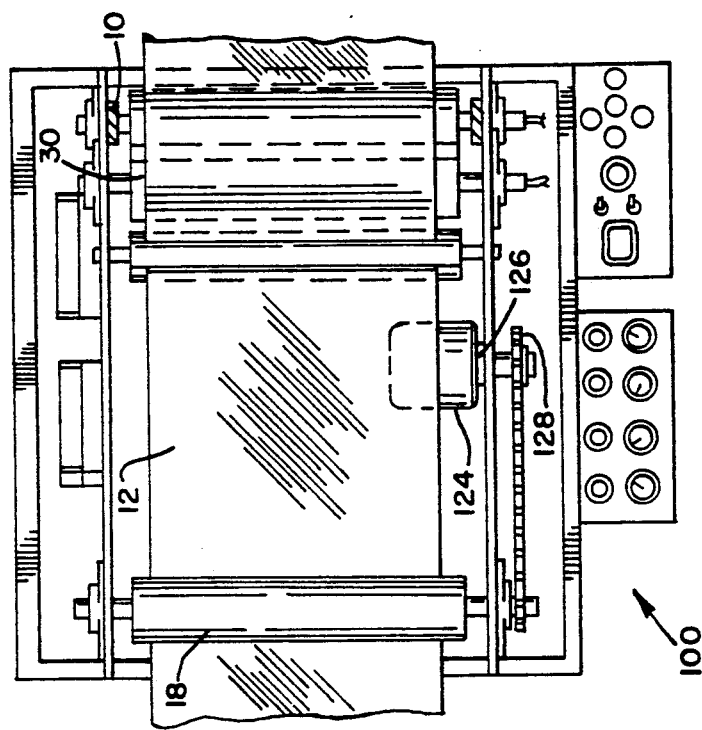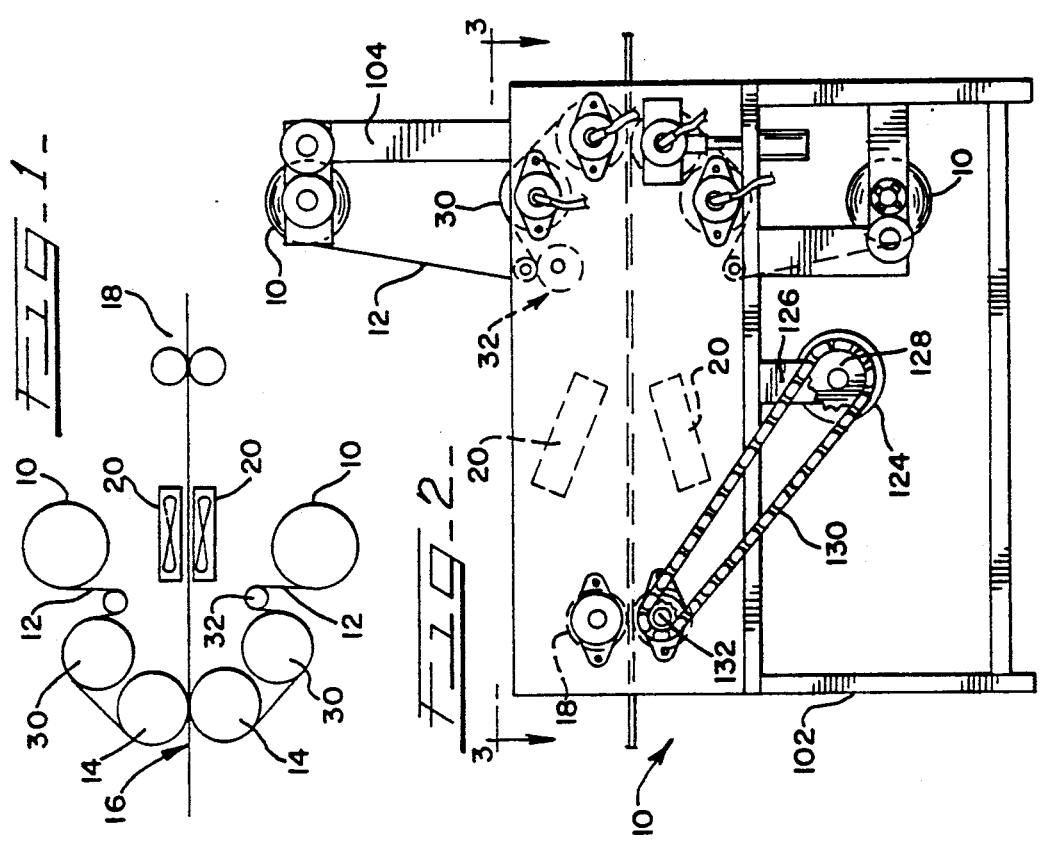

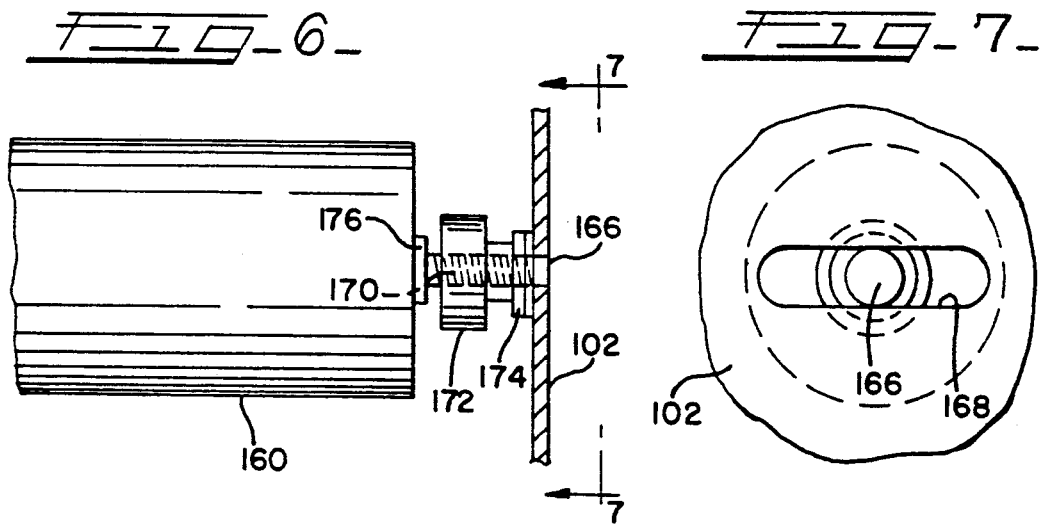
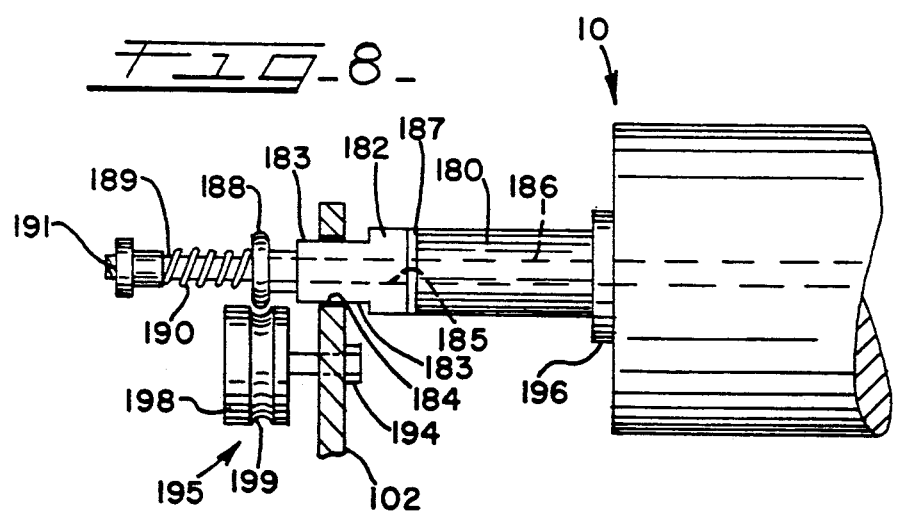
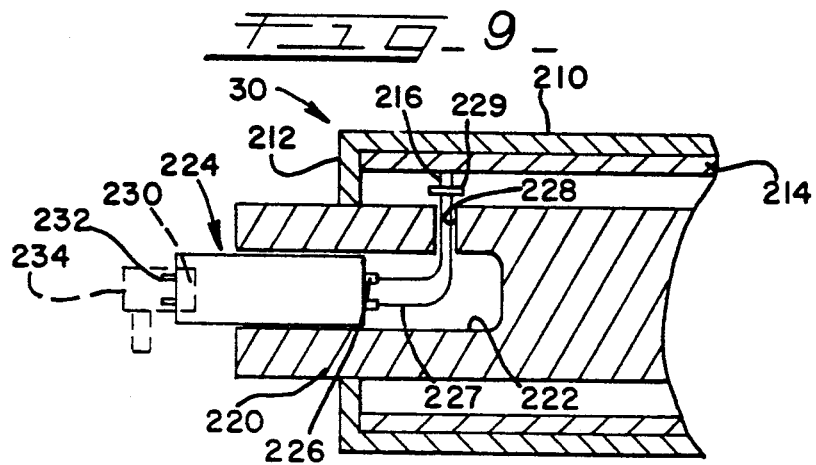

ent application is a Continuation-In-Part application of U.S. Ser. No. 389,510, filed Aug. 4,1989, which is a Continuation-In-Part application of U.S. Ser. No. 104,604, filed Oct. 5, 1987, now abandoned, which is a Divisional application of U.S. Ser. No. 903,391, filed Sept. 3, 1986, now U.S. Pat. No. 4,743,334. which in turn is a continuation-in-part application of U.S. Ser. No. 830,852, filed Feb. 19, 1986, now abandoned.

DOUBLE SIDED LAMINATING MACHINE

REFERENCE TO RELATED APPLICATION

This application is a Continuation-In-Part application of U.S. Ser. No. 389,510, filed Aug. 4,1989, which is a Continuation-In-Part application of U.S. Ser. No. 104,604, filed Oct. 5, 1987, now abandoned, which is a Divisional application of U.S. Ser. No. 903,391, filed Sept. 3, 1986, now U.S. Pat. No. 4,743,334. which in turn is a continuation-in-part application of U.S. Ser. No. 830,852, filed Feb. 19, 1986, now abandoned.

TECHNICAL FIELD

The present invention relates generally to laminating machines and, more particularly, to a continuous laminating system for laminating an article between two sheets of laminating film.

BACKGROUND PRIOR ART

Laminating systems for applying two sheets of plastic film on opposite surfaces of an article have been known for a number of years. Examples of such systems are disclosed in U.S. Pat. Nos. 3,309,983; 4,268,345; and, 4,090,911. In all of these systems, a pair of supply rolls supply two continuous webs of film between and into the nip of a pair of pressure laminating rolls which also receive the article therebetween.

The respective webs of laminating film have a heat-activated coating on one surface thereof and the system includes shoe-type heating members that are partially wrapped around the laminating rollers to heat the rollers. The respective webs of film are entrained over the arcuate shoes to heat the film sufficiently to activate the adhesive so that it becomes slightly fluent or tacky and the pressure laminating rollers bond the heated webs to the article, which is sandwiched therebetween. In this type of system, two sets of pull rollers are located downstream of the pressure rollers and maintain tension on the laminated article as it is being moved between cooling fans, located above and/or below the laminated article.

The shoe-type heating members usually are heated through electrical resisting heating elements that are either mounted in the shoes or adjacent the rear surface thereof. The shoes define generally arcuate surfaces over which the laminating film passes to provide extended contact with the film immediately prior to entering the nip of the laminating rollers and thus activate the adhesive.

Certain problems have been encountered with laminating systems of this type and the primary shortcoming is the unevenness of the heat produced by the shoe-type member which results in varying temperatures across the entire width of the web. In addition, the partially-heated film immediately enters the laminating area from the heated shoes and does not allow for adequate transfer of the heat from the sheets to the adhesive film and also does not allow for distribution of the heat across the sheets. It will be appreciated that uneven heat applied across the web of the sheet can produce either overheating or underheating of the web, which will result in a defective product.

Another problem encountered with the prior art systems is the fact that the laminating film must be of a certain character and, thus, the number of different laminating films that can be used is limited. For example, in the systems disclosed in the prior art, all of the heating of the laminating film is done by the stationary heated shoes immediately before the laminating film enters the nip between the pressure rollers. This is necessary to prevent stretching or elongation of the film in the heated condition, which may cause the film to wrinkle. This is particularly true when using a film such as polypropylene and, thus, these types of machines are incapable of laminating articles utilizing films other than polyester.

Thus, prior art laminating is effectively limited to using polyester films which can be heated by the stationary heated shoes of the type disclosed in U.S. Pat. No. 4,268,345 without stretching or wrinkling.

A further problem with the prior art types of machines is the fact that the speed is extremely limited since the film must be in contact with the heating shoes a sufficient amount of time to elevate the temperature thereof sufficiently to activate the adhesive. Thus, it is necessary to limit the speed of operation to obtain the proper heating characteristics, which may vary depending upon the adhesive and the type of polyester film that are being utilized.

U.S. Pat. No. 4,743,334, issued to Karl Singer, discloses an improved laminating system over the type disclosed in U.S. Pat. No. 4,268,345. The Singer patent, assigned to the Assignee of the present invention, discloses a laminating system that is capable of effectively laminating a variety of different films and includes a pair of freely-rotating preheat rollers that are juxtaposed between the supply rollers and the pressure laminating rollers. The preheat rollers are heated to a temperature slightly below the activating temperature of the adhesive film and laminating film. The adhesive film is elevated to the activating temperature for the adhesive film by the laminating rollers and is bonded to the article.

The drive mechanism for the Singer laminating system includes a drive motor that drives the lower pressure laminating roller and the lower first puller roller, while the second lower pull roller is driven from the first pull roller. The first pull roller is driven at a speed slightly greater than the speed of the laminating roller to maintain a taut condition for the laminated article while it is being cooled by cooling fans.

While the Singer laminating system has met with a remarkable degree of commercial success, certain shortcomings have been observed which are also encountered in other current commercial double-laminating systems. Customarily, the article to be laminated has a width that is less than the width of the laminating film and a certain amount of wrinkling has been encountered in the film that is located beyond opposite edges of the bonded article. While most of this wrinkled excess film is trimmed from the article, the finished product may still have wrinkles along the side borders, which is undesirable.

SUMMARY OF THE INVENTION

According to the present invention, a unique drive system for a double-sided laminating machine has been developed which eliminates the side border wrinkling heretofore encountered in the double-laminating process. More specifically, it has been determined that side border wrinkling can be eliminated by driving only one set of pull rollers and eliminating the second set of pull rollers so that the laminating film is drawn through the pressure laminating rollers by a single driving force at the downstream end of the laminating system.

According to the method aspect of the present invention, the laminating system includes a pair of supply rollers supplying two separate laminating film continuous sheets, each having a heat-activatable film on one surface thereof, to a pair of heated pressure laminating rollers with a pair of rotatable preheat rollers engaging the laminating films upstream of the pressure laminating rollers. The driving force for the laminating films is provided by a single set of pull rollers downstream of the pressure laminating rollers.

Thus, a very compact unit is capable of double-laminating an article at significantly higher production speeds. Moreover, the system utilizes one pair of pull rollers that are significantly smaller in diameter than the laminating rollers to provide a fully-exposed area between the laminating rollers and the pull rollers. This space can accommodate a pair of air-directing ducts positioned directly adjacent the downstream side of the laminating rollers to direct cooling air along the surfaces of the laminating article to significantly increase the cooling effect and thereby increase production speeds.

According to a further aspect of the present invention, the new system preheats the laminating film through the preheat rollers to a temperature below the activating temperature of the adhesive at a location spaced from the laminating rollers and the pressure laminating rollers are also heated to heat the sheet to a temperature at or above the activating temperature for the adhesive. The system is capable of laminating films that heretofore were not practical because of the limited speeds.

According to one further aspect of the invention, the laminating rollers and the preheat means are respectively heated to above and below the activated temperature of the adhesive by independent heat sources to produce a substantially uniform temperature of the sheet along the length of the rollers. The preheat rollers and the laminating rollers are spaced from each other to allow the sheet to heat more uniformly across the width thereof. Also, the preheat rollers are positioned with respect to adjacent guide rollers and the laminating rollers to provide extended surface contact through an arc approaching 180°. This extended contact provides a significant amount of preheating for the laminating film to uniformly heat the heat activated adhesive and the spacing between the laminating rollers and the preheat rollers provides time for the heat to be transferred through the film to the heat activated adhesive layer as well as being distributed across the sheet.

The preheat rollers and the laminating rollers can be heated by suitable means. In the preferred embodiment of the invention, the preheat rollers are heated by a specialized electrical heating means that is attached to an inner surface of the hollow preheat rollers while the laminating rollers are also heated by separate electrical heating means to provide independent control of the heating of the respective sets of rollers. Preferably, the surfaces of the rollers are heated to a temperature in the range of about 200°-220° F. while the laminating rollers are heated to a temperature of about 250°-260° F. by a separate and isolated electrical heating internal elements. Thus, more accurate independent control is provided for heating the respective preheat rollers and the laminating rollers.

The electrical heating means are located internally of the preheat and laminating rollers and energy is provided through a rotating coupling so the arrangement of the components produces a very compact unit that can be manufactured at a reduced cost.

BRIEF DESCRIPTION OF DRAWINGS

FIG. 1 schematically illustrates a continuous double laminating system incorporating the present invention;

FIG. 2 is a side elevational view of the laminating machine showing the details of construction;

FIG. 3 is a top plan view of the machine shown in FIG. 2;

FIG. 6 is a fragmentary side elevational view showing the adjustment for the directing rollers;

FIG. 7 is an end view, as viewed along line 7—7 of FIG. 6;

FIG. 8 is a fragmentary cross-sectional view of the friction-producing means for the supply rollers; and, FIG. 9 is a fragmentary cross-sectional view of a preheat roller included in the preferred disclosed embodiment.

DETAILED DESCRIPTION

Figure 4:
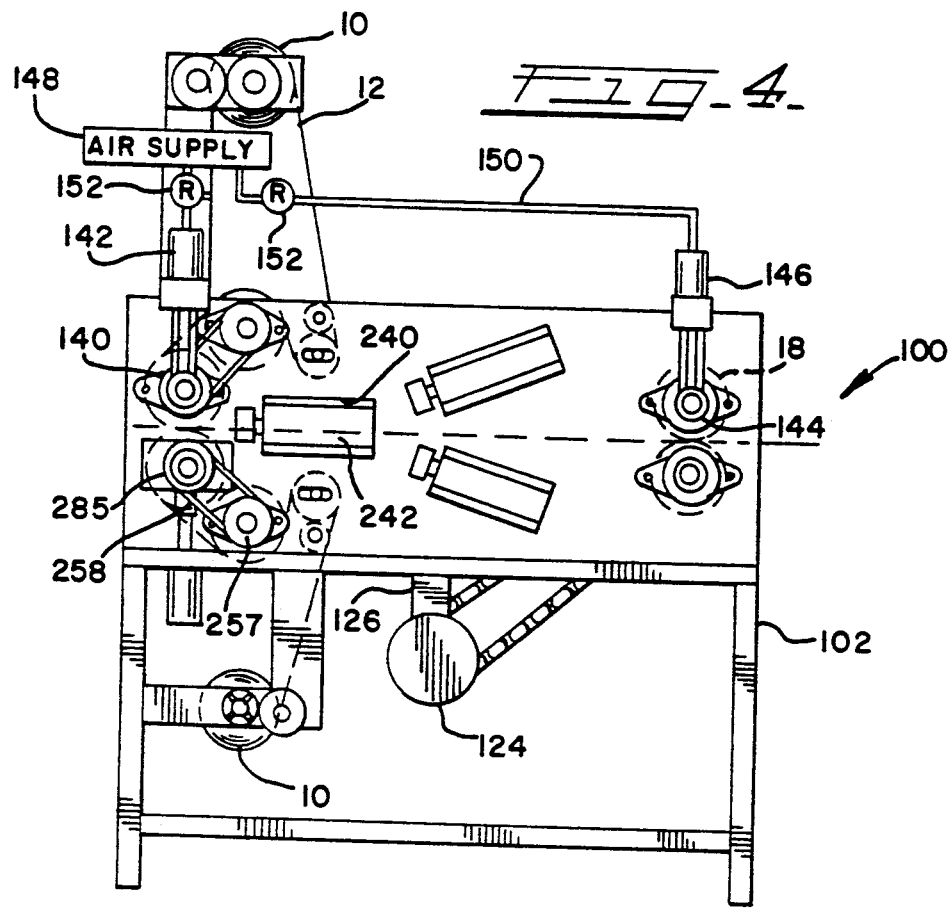
FIG. 4 is a side elevational view of the opposite side of the machine shown in FIG. 2.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the laminating system disclosed therein is specifically designed for applying two films onto opposite surfaces of an article. The system includes a pair of film supply rolls 10 which supply continuous webs of film 12 between a pair of pressure laminating rollers 14, that cooperate to define a nip 16 therebetween. An article (not shown) to be laminated is also fed into the nip 16 between the two webs of film 12. The webs of film 12 have a heat activatable adhesive on one surface thereof which becomes tacky when heated and adheres to the article. A pair of pull rollers 18 are located downstream of the laminating rollers and maintain tension on the film while moving between a pair of cooling fans 20.

In the prior art method of continuous laminating systems for double laminating articles, stationary heated shoes are positioned to at least partially surround the laminating rollers 14 and provide a stationary surface over which the film is drawn and the stationary surfaces are heated, utilizing electric heaters inside the shoes. Such a system is disclosed in U.S. Pat. No. 4,268,345. However, with such systems, it is difficult to evenly heat the web of film across its entire width. Also, it has been found that certain plastic films, such as polypropylene, cannot be used in the laminating system disclosed in the above patent because the polypropylenes will have a tendency to stretch when heated to a temperature sufficient to activate the adhesive on one surface thereof.

Also, in the commercial embodiments of the systems disclosed in U.S. Pat. Nos. 4,743,334 and 4,268,345 both the pressure laminating rollers and the pull rollers are positively driven by a common power source. Also, in the '334 patent, the pull rollers are driven at a speed that is slightly greater, than the speed of the laminating rollers to tension the film. It has been determined that in all of the commercial laminating machines currently in existence, the laminated film has a tendency to wrinkle along the side borders, which is undesirable.

According to one of the primary aspects of the present invention, the continuous double laminating system incorporates a preheat means between the film supply rolls 10 and the laminating rollers 14 to preheat the laminating film 12 to a temperature below the adhesive-activating temperature. In the embodiment illustrated in FIG. 1, the preheat means is in the form of a pair of freely rotatable rollers 30 which are located between the supply rolls 10 and the laminating rollers 14.

A pair of idler or reversing rollers 32 are located between the preheat rollers and the supply rolls 10 and are positioned so that there is substantial contact between at least half of the preheat roll surface and the film. According to one aspect of the invention, the laminating rollers 14 are also heated to a temperature above the activating temperature for the adhesive and there is substantial contact between about one-half of the laminating surface and the film.

Thus, in the illustrated embodiments, independent, separate heating means are provided for the preheat rollers and the laminating rollers which allow for independent adjustment for the temperature of the respective sets of rollers.

Also, the respective reversing rollers 32, preheat rollers 30, and laminating rollers 14 are positioned to define a sinusoidal path from the supply roll 10 to the laminating rollers 14. More specifically, the idler or reversing rollers 32 are positioned to reverse the path of the film by almost 180° and then pass over the preheat rollers 30 where the direction is again reversed and directed to the laminating rollers at an acute angle to have extended surface contact of substantially more than 90° with respect to the laminating rollers 14.

With the system so far described, the webs of film 12 are drawn off the supply rollers by the positively-driven pull rollers 18 and pass across idler or reversing rollers 32 which act as dewrinkler and reversing rollers and come into contact with the preheat rollers 30, which preheat the webs of film to a temperature below the adhesive-activating temperature. The webs of film are then drawn into the nip of the laminating rollers 14, which provides further heating of the film to a temperature sufficient to activate the adhesive and complete the laminating process while causing rotation of the laminating rollers. The laminated articles, along with the continuous laminated film, are then passed between the cooling fans by the pull rollers 18 where the sheet is cooled sufficiently to set the adhesive.

It has been found that the use of the preheat rollers 30 between the supply rollers and the laminating rollers and the final heating of the webs of film by the laminating rollers not only allows for significant increases in laminating speeds but also results in superior laminated articles. Furthermore, the use of independent heating of the laminating rollers 14 and the preheat rollers 30 provides extremely uniform temperatures across the entire width of the webs to provide a superior laminated article.

A further advantage of the laminating system is that the preheat rollers do not heat the laminating film sufficiently so that it will stretch while being suspended in air between the preheat rollers and the laminating rollers. Thus, it has been found that a greater variety of films can be utilized in the laminating process since the film is not actually heated to the laminating temperature where it might stretch until it is in contact with the laminating rollers and is being laminated to the articles. While the temperature parameters will vary according to the adhesive being utilized and the film that is used in the process, it has been found that excellent results are obtained if the preheat rollers are at a temperature in the vicinity of 200°-220° F. and the laminating rollers at a temperature of about 250°-260° F.

The details of the preferred embodiment of the laminating machine are disclosed in FIGS. 2-9 of the specification and the machine is specifically designed to provide a significantly more-compact unit that can readily be produced at a significantly reduced price.

Referring now to FIG. 2, the laminating system, generally designated by reference numeral 100, includes a frame 102 that supports all of the laminating structure to be described. The laminating machine incorporates a pair of laminating rollers 14 that have films 12 supplied thereto from supply rolls 10, with each continuous sheet of film 12 passing over an idler and reversing roll mechanism 32 and a preheat roller 30. The film supply rolls 10 are supported on bracket structures 104.

The reversing or idler roll mechanism 32 and the preheat rollers 30 are positioned to define a generally sinusoidal path between the film supply roll 10 and the laminating roller 14 for the film 12 to maximize the amount of heat that can be absorbed from the preheat rollers, as well as the laminating rollers during the laminating process. Moreover, the preheat roller 30 is spaced from the laminating rollers 14 to provide an area where the film is suspended in air to allow for adequate transfer of heat from the laminating film to the adhesive layer that is on the exposed surface of the laminating film.

Thus, as shown in FIG. 2, the film 12 is delivered along a substantially vertical path from the supply roller 10 to the reversing roller mechanism 32 and then is reversed and directed generally parallel to the first segment of the path, being reversed by an angle approaching 180°, before it comes into engagement with the surface of the preheat roller. The film 12 thus is in contact with the preheat roller 30 through an arc of substantially more than 90° and preferably approaching 180°. This same film is also in extended surface contact with the periphery of the laminating roll 14 through an arc of significantly more than 90°, more preferably on the order of about 135°.

The laminating system 100, shown in FIG. 2, also includes a pair of pull rollers 18 driven from a power source. The power source is preferably an electric motor 124, which is supported by brackets 126 on the frame 102 and has an output sprocket 128 connected to the output shaft thereof. A drive chain 130 is entrained over drive sprocket 128 and a driven sprocket 132 fixed to the lower pull roller 18. Thus, the pull rollers 18 are positively driven and pull the laminating films from supply rolls 10 across preheat rollers 30 and then through laminating rollers 14 causing rotation thereof.

According to one aspect of the present invention, the vertical movement of the upper laminating roller 14 and the upper pull roller 18 is controlled by fluid cylinders in the manner more fully disclosed in the above Singer patent. Thus, as illustrated in FIG. 4, a pair of support brackets 140 are connected to opposite ends of the shaft of the upper laminating roller 14 and are moved along channel brackets (not shown) by a pair of fluid cylinders 142 mounted on frame 102. Also, the shaft of upper pull roller 18 is supported at opposite ends by brackets 144 that are reciprocated on frame 102 by cylinder 146. Pressurized air from a source 148 is connected by conduits 150 to cylinders 142 and 146 and regulators 152 control the pressure thereto.

The fluid pressure to cylinders 142 is preferably controlled by a fluid circuit disclosed in a co-pending application Ser. No. 421,238, filed Oct. 13, 1989, now U.S. Pat. No. 4,993,447, by Arthur Camire, and entitled "Pressure-Regulating Method and Apparatus", incorporated herein by reference.

Moreover, the use of a single set of pull rollers 18 provides a substantially unrestricted open area between the laminating rollers and the pull rollers for the cooling fans 20, as shown in FIG. 2. This maximizes the cooling effect of the heated sheets.

In addition, the single set of pull rollers 18 are much smaller in diameter than the laminating rollers 14. For example, the laminating rollers have a diameter of about 4½ inches, while the pull rollers have a diameter of about 1½ inches. This will open the area of exposure of the film surfaces downstream of the laminating rollers to maximize the cooling effect.

According to one further aspect of the invention, the preheat rollers are driven by the laminating rollers to prevent slippage of the smooth film with respect to the preheat roller surface. Thus, as shown in FIG. 4, the two laminating rollers 14 have pulleys 255 and the two preheat rollers have pulleys 257 with belts 258 entrained thereon.

According to one further aspect of the present invention, the reversing roller mechanism 32 is adjustable to have the film engage the preheat roller truly parallel to the rotational path of the roller. As shown more clearly in FIGS. 5, 6, and 7, the mechanism 32 includes a primary roller 160 and a secondary roller 162.

The primary roller 160 (FIG. 6) is supported on a shaft 166 having opposite ends received into slots 168 in the frame 102. The shaft 166 has threads 170 at opposite ends which receive a threaded locking knob 172 with an aligning washer 174. Locking collars 176 are releasably secured to shaft 166 to axially position roller 160 on shaft 166. Thus, the locking knobs can be released and the shaft 166 can be shifted in slots 168 to position the shaft in any desired angular orientation with respect to the axis of preheat rollers and locked in position by threaded locking knobs 172. Also, reversing or turn-around roller 160 can be adjusted toward and away from the preheat roller 18 to change the angular contact point of the film or web 12 and to also adjust the tension of the film.

For certain films, the amount of surface contact between the preheat rollers and the film can be reduced. In this instance, the film is entrained over only the secondary roller 162 onto the preheat roller 30.

The film tension is also controlled through a friction-producing means so that the tension of the film between the supply roll 10 and the laminating roller 14 is constant.

For this purpose, roller 10 is carried on a hollow shaft 180. The hollow shaft 180 is supported at opposite ends on support collars 182 that have flattened portions 183 received into elongated slots 184 in the frame 102. The support collars have internal openings 185 which receive a support rod 186 that extends through shaft 180 and has a friction washer 187 which is secured to collar 182 and is in frictional engagement with the end of shaft 180. A bearing member 188 is secured to collar 182.

The support rod is threaded at 189 on opposite ends and a spring 190 is telescoped over rod 186 being interposed between a knob 191 and bearing member 188. Thus, rotation of knob 191 on threads 189 will vary the frictional forces between shaft 180 and friction washers 187. The supply roll 10 is retained on shaft 180 by collars 196.

Lateral adjustment for supply roll 10 is also incorporated into the friction-producing means and includes a threaded bolt 194 fixed to frame 102 with an adjusting member 195 threaded onto bolt 194. Adjusting member 195 has a peripheral groove 199 which receives the periphery of bearing member 188 and has a knurled surface 198. Thus, adjusting member 195 can be rotated on bolt 194 and provides lateral adjustment for support collars 182, along with the support shaft 180.

According to one further aspect of the invention, the preheat rollers and the laminating rollers are heated through a unique known electric heating system that utilizes a readily available electrical power source. As illustrated in FIG. 9, the preheat roller 30 consists of a hollow metal or conductive sleeve 210 that has end plates 212 secured thereto.

The sleeve 210 has a conductive member 214 vulcanized or bonded to the inner surface and a pair of leads 216 extend from member 214. The sleeve 210 and end plates 212 are supported on a shaft 220 which is supported by bearings (not shown) on frame 102.

The shaft 220 has a cutout 222 that receives a rotating electrical connection or coupling 224. The rotating electrical connection 224 rotates with shaft 220 and has power conductors 226 connected by leads 227 extending through an opening 228 and connected to leads 216 by a connector 229.

The electrical coupling 224 has a non-rotating bearing member 230 which has power conductors 232 electrically connected to a power source (not shown) through elbow 234. The power conductors 232, 226 are electrically interconnected through a mercury wetted mechanism in electrical connection 224, which is a commercially available coupling.

According to one further aspect of the invention, the laminating machine also incorporates a simplified cooling mechanism for cooling the laminated article immediately after it exits from the nip of the laminating rollers 110.

Figure 5:
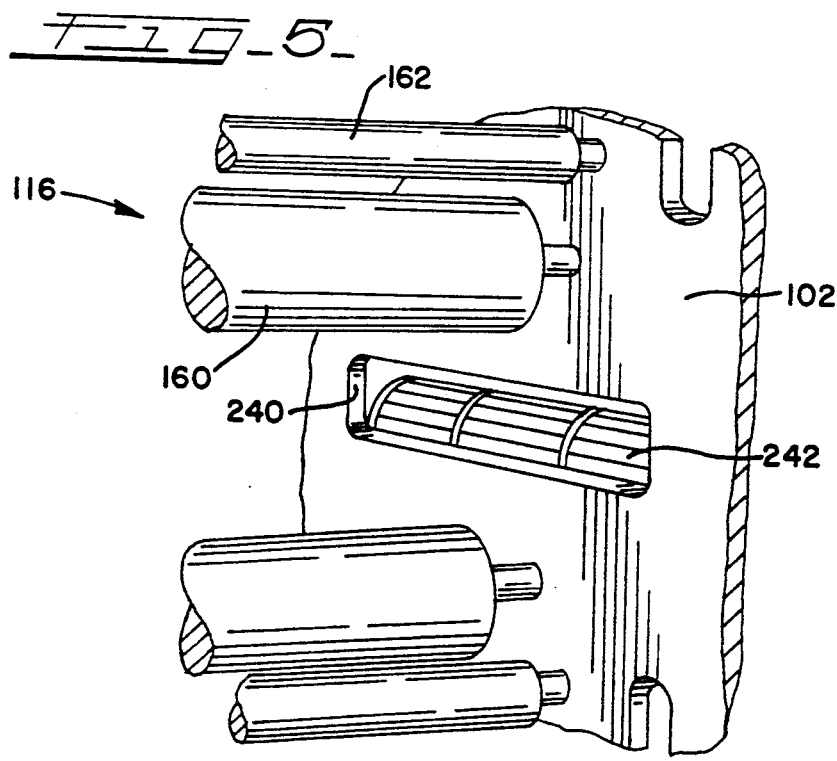
FIG. 5 is a fragmentary exploded perspective view showing the idler or directing rollers for the film.

Thus, as shown in FIG. 5, the frame 102 has an opening 240 located between the idler mechanisms 32 and a paddle fan 242 is located in the opening. The fan draws ambient air from surrounding atmosphere and blows it across the surfaces of the laminated sheets to withdraw heat. If desired, two fans could be located at opposite edges of the laminated article and these could have ducts with louver openings to direct cooling air to the surfaces of the laminated articles. Other air-directing means could be utilized for directing or distributing the air across the laminating articles. The cooling fans 242 could be used in addition to cooling fans 20, as shown in FIG. 4, or could be used in lieu thereof.

While the specific embodiments have been illustrated and described, numerous modifications come to mind without significantly departing from the spirit of the invention and the scope of protection is only limited by the scope of the accompanying claims.

What is claimed:

1. A method of laminating articles between two sheets of laminating film, each said film having a layer of heat-sensitive adhesive thereon, said adhesive having an activating temperature, with each said sheet being supplied from a separate continuous supply roller and over a rotatable preheat roller to a nip between a pair of heated laminating rollers receiving said sheets and said articles with a pair of pull rollers downstream of said laminating rollers, the improvements of heating each said preheat roller to a temperature below said activating temperature, heating each said laminated roller to at least said activating temperature, and driving only said pull rollers to draw said sheets from said supply rolls over said preheat rollers and through said laminating rollers to laminate said sheets to said articles between said laminating rollers.

2. A method as defined in claim 1 in which only one of said pull rollers is driven from a drive source, including the further step of applying fluid pressure to the other of said pull rollers to control the position of said other pull roller relative to said one pull roller and to vary the pulling force applied to said sheets by said pull rollers.

3. A method as defined in claim 1 in which one of said laminating rollers is fixed for rotation about an axis and the other of said laminating rollers is adjustable relative to said axis, the further step of applying pressurized fluid to the other of said laminating rollers to control the position of said other laminating roller relative to said one laminating roller and to vary the pressure applied between said laminating rollers to said sheets and articles.

4. A method as defined in claim 3, including the further step of independently controlling the pressurized fluid applied to opposite ends of the other of said laminating rollers.

5. A method as defined in claim 1, further including a pair of preheat rollers rotatable about a fixed axis between said laminating rollers and respective ones of said supply roll, including the further step of driving said preheat rollers by said laminating rollers by the movement of the laminating rollers as the laminating film moves over the latter rollers.

6. A method as defined in claim 5, in which said preheat rollers and said laminating rollers are hollow and in which said heating includes applying an electric heating source to inner surfaces of said hollow preheat rollers and said hollow laminating rollers.

7. A laminating machine for applying sheets of film to articles disposed therebetween, each said film having a layer of heat-activatable adhesive thereon, said adhesive having an activating temperature, comprising a pair of supply rolls respectively having a continuous supply of film thereon, a pair of rotatable pressure laminating rollers having peripheral surfaces positioned and dimensioned to engage said sheets of film over at least about 90 degrees of their peripheral surfaces and defining a nip for receiving said film and articles, said laminating rollers including first means for heating said laminating rollers to at least said activating temperature, a pair of rotatable preheat rollers respectively located between said supply rolls and said laminating rollers and having peripheral surfaces engaging said sheets of film over at least about 90 degrees of their peripheral surfaces, said preheat rollers including second means for heating said preheat rollers to a temperature below said activating temperature, a pair of pull rollers downstream of said laminating rollers, and motor drive means for driving said pull rollers to draw said sheets of film from said supply rolls along said peripheral surfaces of said preheat rollers into said nip and produce rotation of said laminating rollers for laminating said sheets of film to said articles.

8. A laminating machine as defined in claim 7, in which said preheat and laminating rollers are hollow and said first and second means include electrical heating elements bonded to inner surfaces of said hollow preheat and laminating rollers.

9. A laminating machine as defined in claim 7, in which a first of said pull rollers is fixed for rotation about an axis with said drive means connected thereto, and fluid pressure means adjustably position a second of said pull rollers with respect to said axis of said first pull roller.

10. A laminating machine as defined in claim 9, in which a first of said laminating rollers is fixed for rotation and a second of said laminating rollers is vertically adjustable by independent fluid pressure means on opposite ends of said second of said laminating rollers for adjusting pressure between said first and second laminating rollers.

11. A laminating machine as defined in claim 9, further including coupling means between said laminating rollers and said preheat rollers so that said laminating rollers can drive said preheat rollers.

12. The laminating machine of claim 7 wherein said rotatable preheat rollers are heated to said temperature below said activating temperature and said film makes extended surface contact with each of said lamination and preheat rollers over substantially greater than 90 degrees of the circumference thereof.

* * * * *